United States Patent
Bostwick

(10) Patent No.: US 9,114,701 B2
(45) Date of Patent: Aug. 25, 2015

(54) METHODS AND APPARATUS TO PROVIDE A PROTECTIVE BARRIER TO FUEL TANK COUPLING APPARATUS

(75) Inventor: Christopher C. Bostwick, Rockford, MI (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 860 days.

(21) Appl. No.: 13/242,904

(22) Filed: Sep. 23, 2011

(65) Prior Publication Data

US 2012/0074207 A1    Mar. 29, 2012

Related U.S. Application Data

(60) Provisional application No. 61/386,253, filed on Sep. 24, 2010.

(51) Int. Cl.
*B65D 90/00* (2006.01)
*B60K 15/03* (2006.01)

(52) U.S. Cl.
CPC ......... *B60K 15/03* (2013.01); *B60K 2015/0346* (2013.01); *B60K 2015/03453* (2013.01); *Y10T 29/53* (2015.01)

(58) Field of Classification Search
CPC .......... B60K 15/03; B60K 2015/0346; B60K 2015/03453
USPC .................. 137/587, 588, 202, 382; 228/139; 220/694, 745, 746
See application file for complete search history.

(56) References Cited

U.S. PATENT DOCUMENTS 5,404,907 A * 4/1995 Benjey et al. ................. 137/587
6,431,200 B2 * 8/2002 Brock et al. .................. 137/202

* cited by examiner

*Primary Examiner* — Jacob T Minskey
*Assistant Examiner* — Vishal I Patel
(74) *Attorney, Agent, or Firm* — Hanley, Flight & Zimmerman, LLC

(57) ABSTRACT

Barrier apparatus for use with fuel tanks are described. An example barrier apparatus includes a protective barrier having a support surface and a wall protruding from the support surface to define a cavity. The support couples the protective barrier to a surface of the fuel tank. A weld pad is disposed within the cavity adjacent the support surface.

20 Claims, 4 Drawing Sheets

METHODS AND APPARATUS TO PROVIDE A PROTECTIVE BARRIER TO FUEL TANK COUPLING APPARATUS

CROSS REFERENCE TO RELATED APPLICATION

This patent claims the benefit of U.S. Provisional Patent Application Ser. No. 61/386,253, filed on Sep. 24, 2010, entitled METHODS AND APPARATUS TO PROVIDE A PROTECTIVE BARRIER TO FUEL TANK COUPLING APPARATUS, which is incorporated herein by reference in its entirety.

FIELD OF THE DISCLOSURE

The present disclosure relates generally to fuel delivery systems and, more particularly, to methods and apparatus to provide a protective barrier to fuel tank coupling apparatus.

BACKGROUND

Fuel delivery systems of marine vehicles typically include a fuel tank having a plurality of coupling apparatus or components that are coupled to a surface of the fuel tank. For example, the fuel tank coupling apparatus may include, but are not limited to, grade valves, vent valves, fill line inlet valves, anti-siphon valves, and/or any other component or coupling to be coupled to the fuel tank. These coupling apparatus fluidly couple various components or systems (e.g., a venting system) of the fuel delivery system to the fuel tank.

In some instances, portions of the coupling apparatus (e.g., a barb fitting of a grade valve) may become damaged during shipment of the fuel tank (having the coupling apparatus attached to a surface of the fuel tank) and/or shipment of the coupling apparatus. Additionally or alternatively, a coupling apparatus is typically composed of a thermoplastic material, which provides relatively low resistance to temperatures and, thus, may not be in compliance with certain government standards or regulations (e.g., SCG Fire safety standards per CFR 33).

DETAILED DESCRIPTION

In general, an example fuel delivery system described herein may be used with marine crafts or vehicles. The example fuel delivery system described herein includes enhanced or improved fuel tank coupling apparatus or fittings (e.g., a grade valve) that are implemented with an example protective barrier described herein. An example protective barrier apparatus described herein protects the fuel tank coupling apparatus from damage during, for example, shipment (or handling) of the fuel tank and/or during shipment of the coupling apparatus. Additionally or alternatively, an example protective barrier apparatus described herein provides compliance with certain government standards (e.g., SCG Fire safety standards per CFR 33). More specifically, the example protective barrier apparatus provides local protection to a fuel tank coupling apparatus such that, in the event of a fire, the protective barrier apparatus is destroyed first (e.g., provides a sacrificial wall), thereby providing a duration of time (e.g., greater than two and a half minutes) before the flames reach the fuel tank coupling apparatus.

As used herein, a "fluid" includes, but is not limited to, a liquid such as fuel (e.g., gasoline), a vapor such as fuel vapor (e.g., gasoline vapor), a gas (e.g., air) and/or any combination or mixture thereof.

Figure 1:
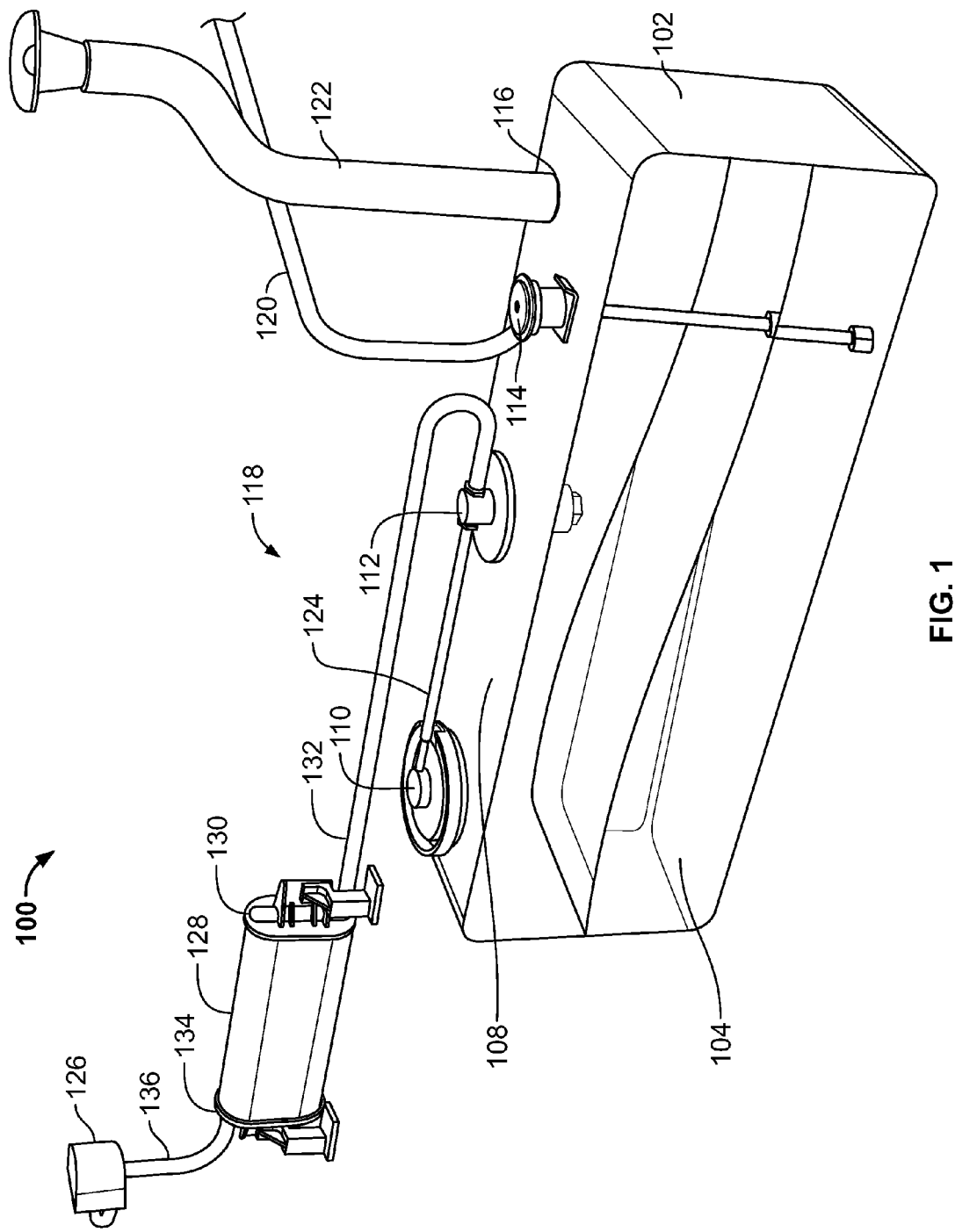
FIG. 1 is schematic representation of an example fuel delivery system having a fuel tank coupling apparatus implemented with an example protective barrier described herein.

FIG. 1 illustrates an example marine fuel delivery system 100 described herein. The fuel delivery system 100 includes a fuel tank 102 for storing fuel 104 (e.g., gasoline, diesel fuel, etc.) and has a plurality of fuel tank coupling apparatus or fittings mounted or coupled to an outer, upper surface 108 of the fuel tank 102. The fuel tank coupling apparatus 110-116 fluidly couple various systems or components of the fuel delivery system 100 to the fuel tank 102. For example, the fuel tank coupling apparatus 110-116 may include, but are not limited to, grade valves, vent valves, fill line inlet valves, anti-siphon valves, fuel demand valves, or any other component or coupling apparatus to be mounted or coupled to a surface (e.g., the surface 108, a side surface, etc.) of the fuel tank 102. In this example, a coupling apparatus of the fuel tank 102 include a grade valve assembly 110, a vent valve 112, a fuel demand valve 114, and an inlet valve 116. For example, the grade valve assembly 110 and the vent valve 112 fluidly couple a venting system 118 to the fuel tank 102, the fuel demand valve 114 fluidly couples a fuel line 120 to the fuel tank 102, and the inlet valve 116 fluidly couples a filler tube apparatus 122 to the fuel tank 102.

The venting system 118 equalizes the pressure in the fuel tank 102 to accommodate volumetric changes (e.g., expansion) in the fuel tank 102. In this example, tubing 124 fluidly couples the vent valve 112 and the grade valve assembly 110, and the vent valve 112 is fluidly coupled to a vent 126 that vents to, for example, the atmosphere. To help reduce venting emissions and/or pollutants to the environment, the venting system 118 may include a vapor collection apparatus 128, which is disposed between the vent 126 and the vent valve 112 such that an inlet 130 of the vapor collection apparatus 128 is fluidly coupled to the vent valve 112 via tubing 132 and an outlet 134 of the vapor collection apparatus 128 is fluidly coupled to the vent 126 via tubing 136. The vapor collection apparatus 128 includes an emission(s)-capturing or filter material (e.g., an adsorbent material) such as, for example, activated carbon, charcoal, etc., that collects and stores evaporative emissions such as, for example, hydrocarbons to reduce pollution to the environment. The emissions captured and stored by the vapor collection apparatus 128 are returned or carried to the fuel tank 102 as air is drawn from the atmosphere to the fuel tank 102 and flows through the vapor collection apparatus 128 between the outlet 134 and the inlet 130 via the venting system 118.

Figure 2A:
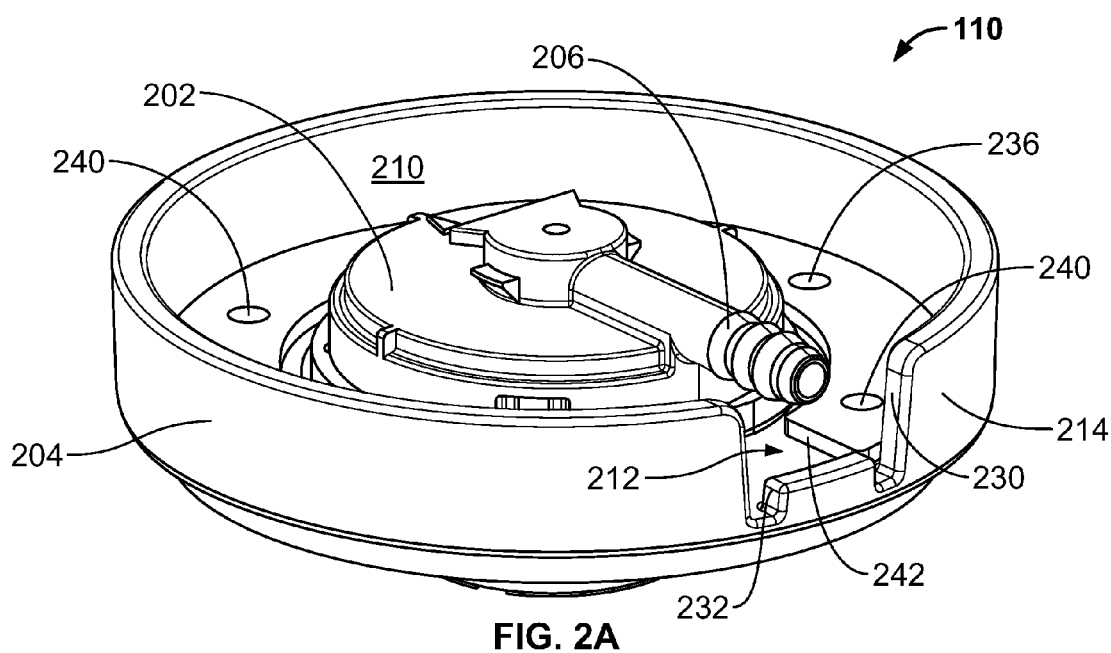
FIG. 2A is an enlarged view of the example fuel tank coupling apparatus of FIG. 1.
Figure 2B:
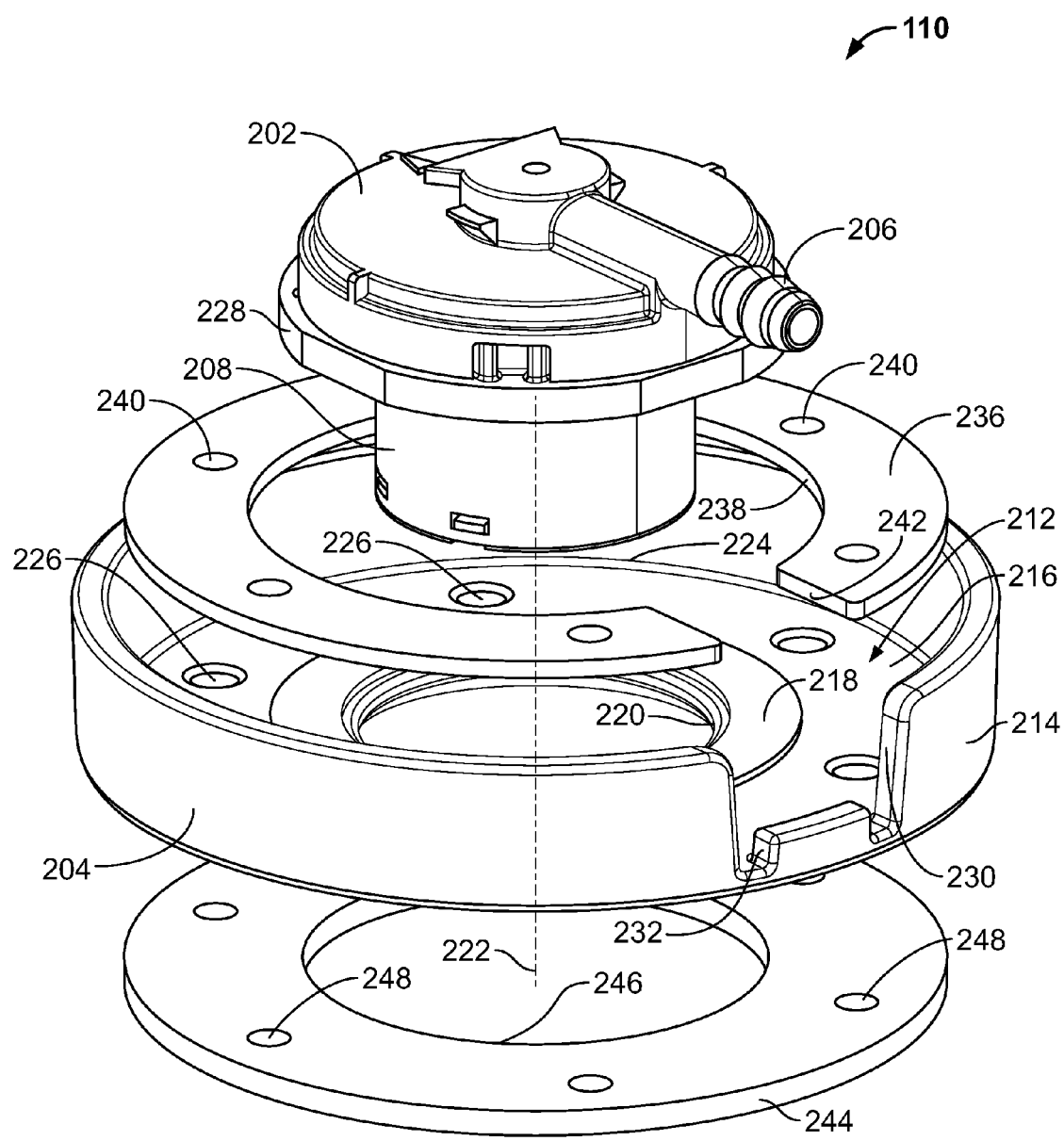
FIG. 2B illustrates an exploded view of the example fuel tank coupling apparatus of FIGS. 1 and 2A.

FIG. 2A is an enlarged view of the example grade valve assembly 110 shown in FIG. 1. FIG. 2B illustrates an exploded view of the example grade valve assembly 110 of FIGS. 1 and 2A. Referring to FIGS. 2A and 2B, the example grade valve assembly 110 includes valve 202 and a protective barrier or flange 204. The valve 202 includes a fitting 206 (e.g., a barb fitting) that is coupled to a valve body 208 (FIG.

2B). The fitting 206 receives, for example, the tubing 124 of FIG. 1 to fluidly couple the fuel tank 102 to the venting system 118 (FIG. 1). The fitting 206 and/or the valve body 208 may be composed of a plastic material (e.g., a thermoplastic material), a metallic material (e.g., stainless steel), etc. The fitting 206 and/or the valve body 208 may be manufactured via, for example, injection molding as separate pieces and may be coupled together via snap-fit connection, welding (e.g., plastic welding), fasteners (e.g., mechanical fasteners, chemical fasteners, etc.) or any other suitable fastening mechanism(s). In some examples, the fitting 206 and the valve body 208 are integrally formed as a unitary piece or structure (e.g., via injection molding).

In this example, the protective barrier 204 substantially surrounds or encircles (e.g., a peripheral or outer edge of) the valve 202 when the valve 202 is coupled to the protective barrier 204. The protective barrier 204 is shown as a cylindrically-shaped body having a cavity 210 to define a support surface 212 and an annular wall 214. In other examples, the protective barrier 204 may be square, oval or may have any other shape(s). The support surface 212 may include a recessed surface 216 (e.g., an annular recessed surface) to define a stepped or elevated rim or weld pad 218 adjacent an opening 220 (e.g., a central opening) of the support surface 212. In this example, the opening 220 is substantially axially aligned with an axis 222 of the valve body 208 when the valve 202 is coupled to the protective barrier 204. As shown in this example, the wall 214 protrudes away from the support surface 212 about a peripheral edge 224 of the recessed surface 216. The opening 220 of the support surface 212 has a diameter that is larger than an outer diameter of the valve body 208 so that the protective barrier 204 slidably receives at least a portion of the valve body 208.

The support surface 212 may also include a plurality of apertures 226 for receiving fasteners (e.g., bolts) to couple the grade valve assembly 110 to the surface 108 of the fuel tank 102. For example, the fuel tank 102 may include fasteners (e.g., nuts) that are molded (e.g., insert molded) with the surface 108 of the fuel tank 102 to receive the fasteners of the grade valve assembly 110 when coupling the grade valve assembly 110 to the fuel tank 102. Thus, the example grade valve assembly 110 is coupled to the fuel tank 102 via a clamp and compression gasket.

In this example, at least the weld pad 218 and the protective barrier 204 are composed of a thermoplastic material such as, for example, high density Polyethelyne, a polyvinyl chloride material, a nylon material, a Polyurethane Prepolymer material and/or any other thermoplastic material(s).

The valve 202 includes a flange 228 disposed between the fitting 206 and the valve body 208. The flange 228 has an outer diameter that is larger than the outer diameter of the valve body 208 and the diameter of the opening 220 so that the flange 228 engages the support surface 212 when the valve 202 is coupled to the protective barrier 204. In particular, as described in greater detail below, at least a portion of the flange 228 engages at least a portion of the weld pad 218. The wall 214 includes an access opening or port 230 to enable the tubing 124 to be coupled to the fitting 206 when the valve 202 is coupled to the protective barrier 204. The access port 230 also includes a bearing or load surface 232 to provide support to, for example, the tubing 124 when the tubing 124 is coupled to the fitting 206 to substantially reduce stress or loads that may be imparted to the fitting 206 by the tubing 124 when the tubing 124 is coupled to the fitting 206.

The grade valve assembly 110 may include a washer 236 (e.g., a metal washer) that is to be disposed within the cavity 210 and engage the recessed surface 216. The washer 236 includes an opening 238 that is coaxially aligned with the opening 220 of the support surface 212 and has a diameter that is larger than an outer diameter of the flange 228 of the valve 202 and the diameter of the weld pad 218. The washer 236 includes a plurality of apertures 240 that align with the plurality of apertures 226 of the recessed surface 216 when the washer 236 is disposed within the cavity 210. Further, in this example, the washer 236 includes an opening 242 that is to align with the access port 230 of the wall 214 when the washer 236 is disposed within the cavity 210. In this manner, the opening 242 provides clearance relative to the fitting 206 during assembly of the grade valve assembly 110 and, in some instances, depending on the thickness of the washer 236, the washer 236 will not interfere with the tubing 124 when the tubing 124 is coupled to the fitting 206. The washer 236 takes or absorbs the load provided by the fasteners when the fasteners couple the grade valve assembly 110 to the surface 108 of the fuel tank 102.

The grade valve assembly 110 may also include a seal or gasket 244 (e.g., a rubber gasket) to provide a seal between the grade valve assembly 110 and the fuel tank 102 when the grade valve assembly 110 is coupled to the fuel tank 102. As shown in FIG. 2B, the gasket 244 includes an opening 246 to receive a portion of the valve body 208 when the valve 202 is coupled to the protective barrier 204. The gasket 244 also includes a plurality of apertures 248 that align with the plurality of apertures 226 and 240 of the recessed surface 216 and the washer 236, respectively.

Figure 3:
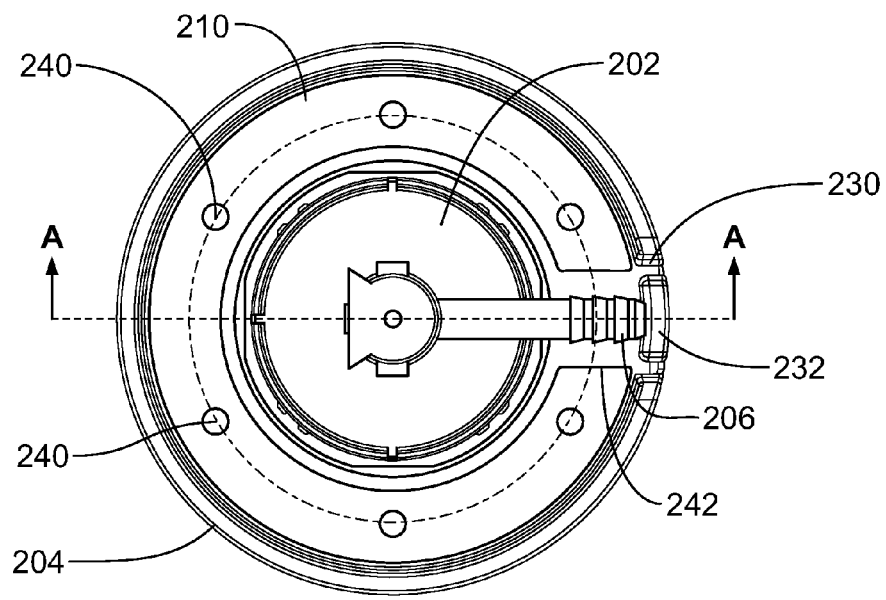
FIG. 3 illustrates a plan view the example fuel tank coupling apparatus of FIGS. 1, 2A and 2B.
Figure 4A:
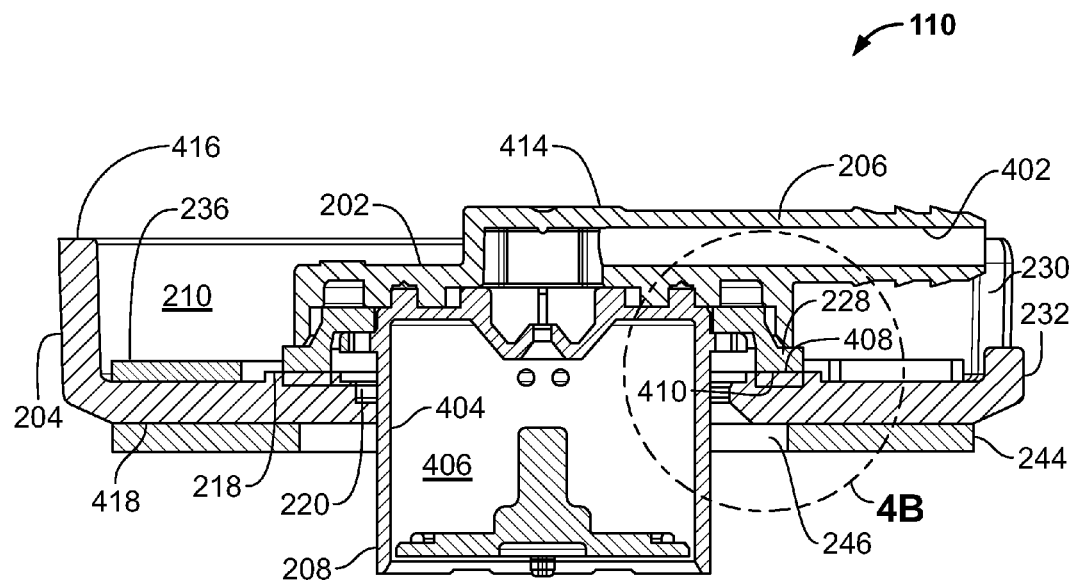
FIG. 4A illustrates a cross sectional view of the example fuel tank coupling apparatus taken along line A-A of FIG. 3.
Figure 4B:
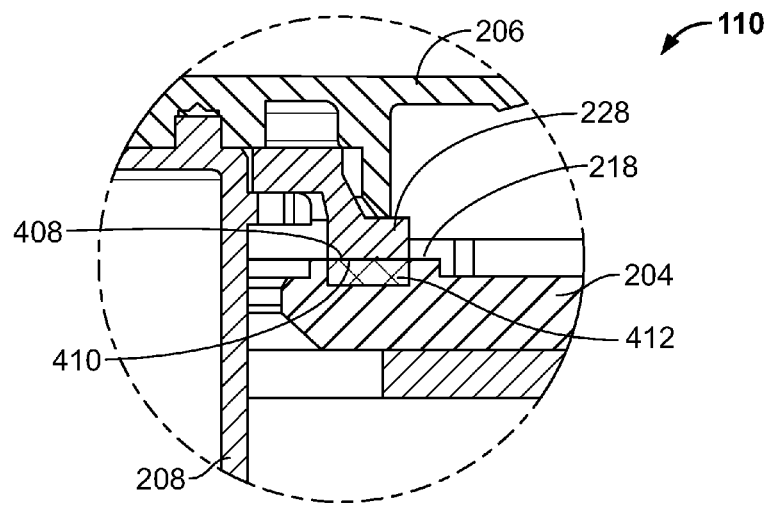
FIG. 4B illustrates an enlarged view of a portion of the example fuel tank coupling apparatus of FIG. 4A.

FIG. 3 is a plan view of the example grade valve assembly 110 of FIGS. 2A and 2B. FIG. 4A is a cross-sectional view of the example grade valve assembly 110 taken along line A-A of FIG. 3. FIG. 4B is an enlarged view of a portion of the example grade valve assembly 110 of FIG. 4A. Referring to FIGS. 4A and 4B, the fitting 206 includes an opening 402 and the valve body 208 includes an opening 404 that define a passageway 406 to allow fuel vapors and/or air to flow through the grade valve assembly 110 between the fuel tank 102 and the atmosphere via the venting system 118 (FIG. 1).

To assemble the valve 202 and the protective barrier 204, the valve 202 is disposed within the cavity 210 of the protective barrier 204. In particular, the valve body 208 is at least partially disposed within the opening 220 of the protective barrier 204 until at least a portion 408 of the flange 228 engages at least a portion 410 of the weld pad 218. In this example, the valve 202 is permanently or integrally coupled to the protective barrier 204. As noted above, both the valve 202 and the protective barrier 204 are composed of thermoplastic materials such as, for example, High Density Polyethelyne. In some examples, only the portion 408 of the flange 228 and only the portion 410 of the weld pad 218 are composed of a thermoplastic material (e.g., HDPE). Because the flange 228 and the weld pad 218 are composed of a thermoplastic material, the valve 202 can be permanently fixed or attached to the protective barrier 204 via, for example, plastic welding (e.g., hot plate welding). In particular, in this example, the portion 408 of the flange 228 and the portion 410 of the weld pad 218 of the protective barrier 204 are heated to a temperature above the melting temperature of the materials of the portions 408 and 410 of the flange 228 and the weld pad 218. When the materials of the portions 408 and 410 of the flange 228 and the weld pad 218 cool, the materials of the portions 408 and 410 integrally mesh and solidify or harden as schematically illustrated with reference numeral 412 of FIG. 4B, thereby permanently attaching the valve 202 to the protective barrier 204. In other examples, any portion of the valve 202 and/or the protective barrier 204 may be heated to permanently attach or fix the protective barrier 204 and the valve 202. Although not shown, in other examples, the protective barrier 204 may be integrally formed with the valve body 208 and/or the valve 202 as a unitary piece or structure via, for example, injection molding. For example, the protective barrier 204 may be integrally formed with the flange 228.

As shown in FIG. 4A, when the valve 202 is coupled to the protective barrier 204, the fitting 206 is positioned adjacent the access port 230 of the wall 214 and the valve 202 is at least partially recessed within the cavity 210 of the protective barrier 204 so that an upper surface 414 of the valve 202 is above an upper edge 416 of the protective barrier 204. In some examples, the valve 202 is fully recessed within the cavity 210 so that the upper surface 414 of the valve 202 is below the upper edge 416 of the wall 214. Thus, the wall 214 may be sized to extend above an upper surface (e.g., the upper surface 414) of a valve (e.g., the valve 202). The washer 236 is then disposed within the cavity 210 and adjacent the valve 202 so that the apertures 240 are substantially, coaxially aligned with the apertures 226 of the recessed surface 216 and the opening 238 is coaxially aligned with the axis 222. Further, the opening 242 of the washer 236 is substantially aligned with the access port 230 of the protective barrier 204 as most clearly shown in FIG. 3. The gasket 244 may be coupled to an under surface 418 of the protective barrier 204 such that the opening 246 of the gasket 244 receives the valve body 208 and the apertures 248 are coaxially aligned with the apertures 226 of the recessed surface 216 and the apertures 240 of the washer 236. The grade valve assembly 110 is then fastened to the surface of the fuel tank 102 via, for example, fasteners.

As noted above, the grade valve assembly 110 is coupled to the surface 108 of the fuel tank 102 via a clamp and gasket compression. Alternatively, in other examples, a surface (e.g., the surface 108 of FIG. 1) of a fuel tank (e.g., the fuel tank 102 of FIG. 1) may be implemented with a plurality of insert materials to enable a plurality of coupling apparatus or components (e.g., the grade valve assembly 110) to be coupled to the surface of the fuel tank via, for example, welding (e.g., plastic welding). Such an example insert material is described in U.S. patent application Ser. No. 12/793,005, which is incorporated herein by reference in its entirety. In yet other examples, a portion of the protective barrier 204 and/or a portion of the valve 202 may be composed of a first material or a thermoplastic material and the other portions of the valve 202 and/or the protective barrier may be composed of a second material or a thermoset material. For example, the weld pad 218 and/or the flange 228 may be composed of a thermoplastic material (e.g., HDPE) and the wall 214 and the recessed surface 216 of the protective barrier and/or the valve body 208 and the fitting 206 may be composed of a thermoset material (e.g., Ethylene Vinyl Alcohol or EVOH).

As noted above, when the grade valve assembly 100 is coupled to the fuel tank 102, the protective barrier 204 protects the valve 202 (e.g., the fitting 206) from becoming damaged during shipment (or handling) of the fuel tank 102.

Additionally or alternatively, the protective barrier 204 provides local protection to the valve 202 in compliance with certain government standards or regulations (e.g., SCG Fire safety standards per CFR 33). For example, many fuel tank coupling apparatus or components are composed of thermoplastic materials that have relatively low temperature resistance and, thus, may not be in compliance with certain government standards because such components composed of low temperature thermoplastic materials often lack sufficient protection from heat during a fire. For example, government regulations require a fuel tank coupling to withstand heat from a fire for a specific duration of time (e.g., for at least two and a half minutes).

The grade valve assembly 110 described herein provides adequate protection from fire for a duration of, for example, at least two and half minutes. For example, if flames propagate around sides of the fuel tank 102, the protective barrier 204 blocks the flames from reaching the valve 202 for a duration of time (e.g., for at least two and a half minutes). Further, the wall 214 of the protective barrier 204 provides a sacrificial structure because the wall 214 substantially surrounds the valve 202 and, thus, will be destroyed by the flames of a fire before the flames reach the valve 202.

Although not shown, in other examples, any one of the plurality of coupling apparatus or components of a fuel tank such as, for example, a vent valve, a fill line inlet valve, an anti-siphon valve, a fuel demand valve, or any other fuel tank coupling apparatus or fittings may be implemented with the example protective barrier 204 described herein. For example, the fuel demand valve 112 and/or the inlet valve 114 of the fuel tank 102 of FIG. 1 may be implemented with the example protective barrier 204 described herein.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A coupling apparatus for use with a fuel tank comprising:
    a protective barrier having a support surface and a wall protruding from the support surface to define a cavity, wherein the support surface is to couple the protective barrier to a surface of the fuel tank, the protective barrier configured to receive a valve from above an upper surface of the wall, wherein an outer surface of the wall has a perimeter that is greater than an outermost dimensional footprint of the valve such that the valve is at least partially recessed within the cavity and relative to the upper surface of the wall, the wall of the protective barrier substantially to surround the valve when the valve is positioned within the cavity, the wall of the protective barrier having an access to enable tubing to be coupled to a fitting of the valve; and
    a weld pad disposed within the cavity adjacent the support surface.

2. The coupling apparatus defined in claim 1, wherein the weld pad and the support surface are each composed of a thermoplastic material.

3. The coupling apparatus defined in claim 1, wherein the weld pad and the support surface are integrally formed as a unitary structure, and wherein a recessed surface of the support surface defines the weld pad.

4. The coupling apparatus defined in claim 1, wherein the protective barrier comprises a cylindrical body and the wall comprises an annular wall or flange defined by the cylindrical body.

5. The coupling apparatus defined in claim 1, wherein the support surface includes a first opening and the weld pad includes a second opening coaxially aligned with the first opening.

6. The coupling apparatus defined in claim 5, further comprising the valve, wherein the respective openings of the support surface and the weld pad are configured to receive a body portion of the valve after the protective barrier is coupled to the surface of the fuel tank.

7. The coupling apparatus defined in claim 6, wherein the weld pad is to engage a flange portion of the valve when the valve is disposed in the respective openings.

8. The coupling apparatus defined in claim 7, wherein the flange has a first diameter that is larger than a second diameter of the second opening of the weld pad so that the flange engages the weld pad when the valve is coupled to the protective barrier.

9. The coupling apparatus defined in claim 8, wherein the flange is coupled to the weld pad of the protective barrier via plastic welding after the protective barrier is coupled to the surface of the fuel tank.

10. The coupling apparatus defined in claim 1, further comprising the valve, the valve having the fitting extending away from a body of the valve in a direction non-parallel to a longitudinal axis of the valve, wherein the wall of the protective barrier substantially encircles the fitting of the valve.

11. The coupling apparatus as defined in claim 1, wherein the support surface is composed of a first material and the weld pad is composed of a second material different than the first material.

12. The coupling apparatus as defined in claim 1, wherein the support surface comprises a plurality of openings to receive a plurality of fasteners to couple the protective barrier to the fuel tank.

13. The coupling apparatus as defined in claim 1, further comprising a washer disposed within the cavity of the protective barrier, the washer disposed on the support surface and adjacent the weld pad.

14. A coupling apparatus for use with a fuel tank, comprising
means for protecting a valve and means for supporting the valve to define means for receiving the valve, the means protecting the valve extending from the means for supporting the valve a height to enable at least a portion of the valve to be at least partially recessed relative to the means for protecting to enable the means for protecting to substantially surround a peripheral edge of the valve when the valve is coupled to the means for supporting the valve, the means for protecting the valve having means or allowing access to the means for receiving; and
means for attaching the valve to the means for supporting, the means for attaching integrally formed with the means for supporting, and the means for protecting and the means for supporting to be coupled to the fuel tank prior to coupling the valve to the means for supporting.

15. The coupling apparatus of claim 14, wherein a flange portion of the valve engages the means for attaching the valve when the valve is disposed within the means for receiving.

16. A coupling apparatus for a fuel tank comprising:
a barrier to be coupled to an outer surface of the fuel tank, the barrier comprising a support surface and a wall extending from the support surface to define a cavity, the wall having an access port;
a weld pad positionable within the cavity such that a first side of the weld pad engages the support surface; and
a valve positionable within the cavity of the barrier after the barrier is coupled to the outer surface of the fuel tank such that a flange portion of the valve engages the weld pad, wherein the weld pad and the flange portion of the valve body are heat welded to couple the valve body to the fuel tank via the weld pad, and wherein the valve is at least partially recessed within the cavity and relative to an upper surface of the wall such that an outermost perimeter of the wall substantially surrounds the valve when the valve is coupled to the barrier, wherein an outlet of the valve is accessible via the access port.

17. The coupling apparatus of claim 16, wherein the barrier is coupled to the surface of the fuel tank via a plurality fasteners that pass through respective openings of the support surface.

18. The coupling apparatus of claim 16, wherein the barrier is to be coupled to the surface of the fuel tank prior to coupling the valve body and the barrier.

19. The coupling apparatus of claim 1, wherein the fuel tank is composed of a non-weldable plastic material.

20. The coupling apparatus of claim 1, wherein only a portion of the fitting of the valve extends above the upper surface of the wall when the valve is coupled to the protective barrier.

* * * * *